United States Patent [19]

Rhodes

[11] Patent Number: 4,593,970
[45] Date of Patent: Jun. 10, 1986

[54] FIBER OPTIC FEEDTHROUGH MODULE, AND METHOD OF MAKING SAME

[75] Inventor: Geoffrey M. Rhodes, Orchard Park, N.Y.

[73] Assignee: Conax Buffalo Corporation, Buffalo, N.Y.

[21] Appl. No.: 497,857

[22] Filed: May 25, 1983

[51] Int. Cl.[4] .................................................. G02B 7/26
[52] U.S. Cl. ..................................... 350/96.20; 174/705
[58] Field of Search ........................... 350/96.20, 96.21; 174/705

[56] References Cited

U.S. PATENT DOCUMENTS

| | | | |
|---|---|---|---|
| 3,880,452 | 4/1975 | Fields | 350/96.21 X |
| 4,026,633 | 5/1977 | Crick | 350/96.21 |
| 4,296,996 | 10/1981 | Niiro et al. | 350/96.20 |

FOREIGN PATENT DOCUMENTS

| | | | |
|---|---|---|---|
| 2531994 | 2/1977 | Fed. Rep. of Germany | 350/96.21 |
| 3127135 | 1/1983 | Fed. Rep. of Germany | 350/96.20 |

*Primary Examiner*—John Lee
*Attorney, Agent, or Firm*—Sommer & Sommer

[57] ABSTRACT

A fiber optic feedthrough module which comprises a metal sleeve, a fiber optic element extending through the sleeve relation thereto, and a tandem series of centrally-apertured mating annular sealant bodies of thermoplastic material surrounding the fiber optic element and compressed between it and the sleeve. The module is made by first providing a loose sub-assembly of a plurality of individual but interfitting sealant bodies on the fiber optic element and then inserting this subassembly into a metal sleeve, followed by swaging the whole assembly which eliminates clearances and provides sealed interfaces between the various contacting components.

10 Claims, 6 Drawing Figures

U.S. Patent    Jun. 10, 1986    4,593,970
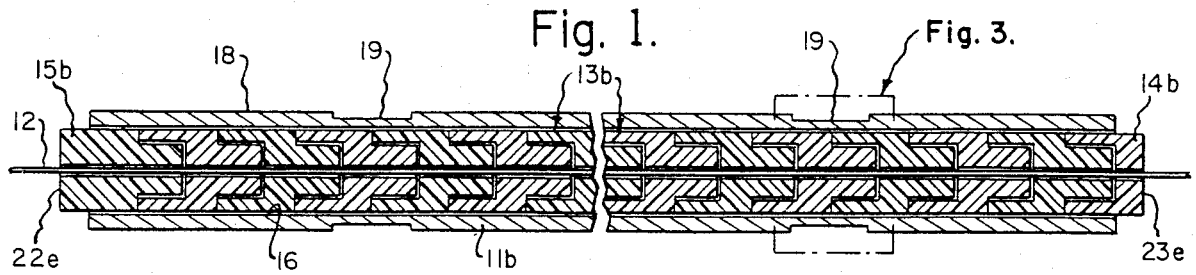
Fig. 1.
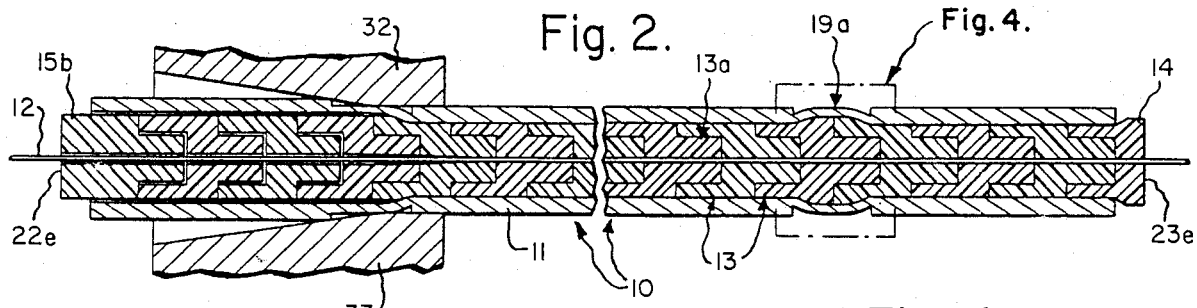
Fig. 2.
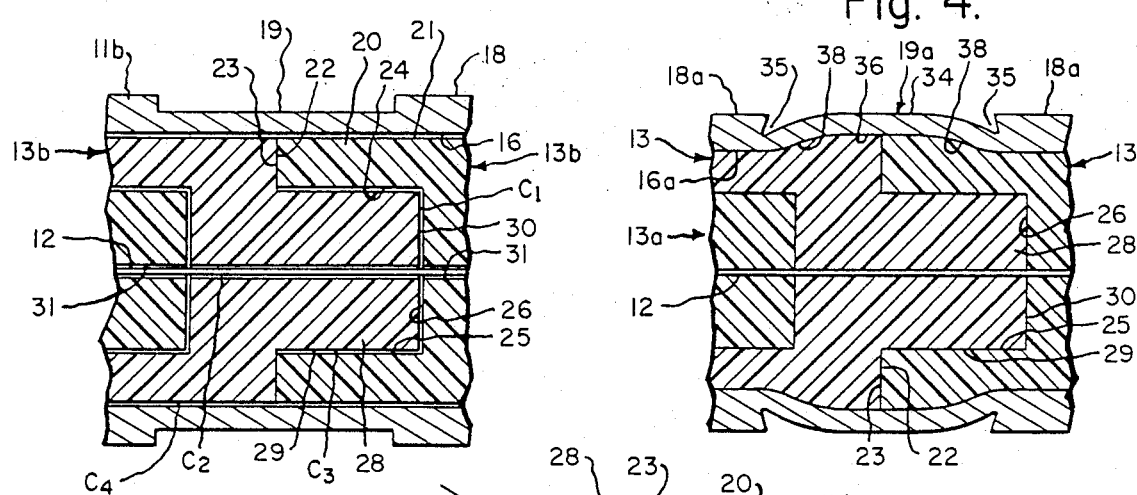
Fig. 3.
Fig. 4.
Fig. 5.
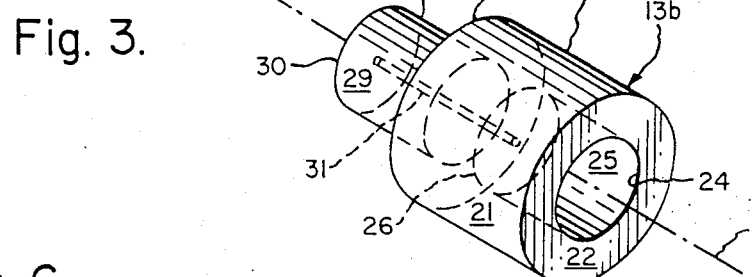
Fig. 6.
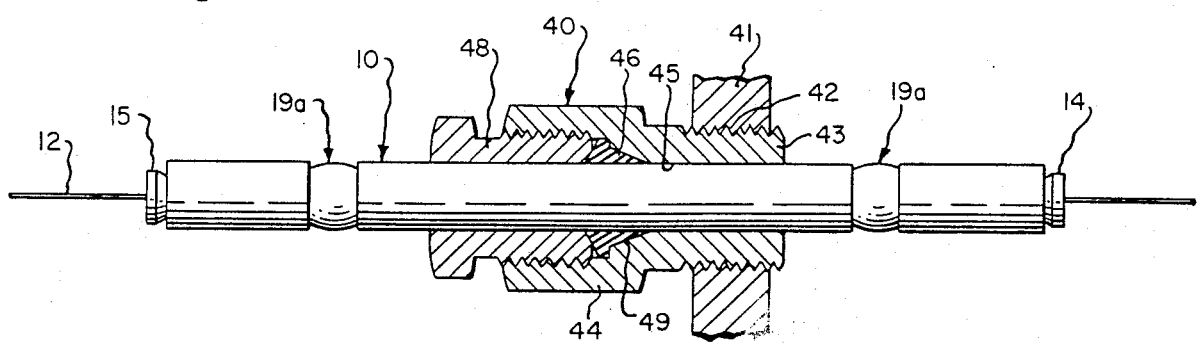

FIBER OPTIC FEEDTHROUGH MODULE, AND METHOD OF MAKING SAME

This invention relates to the field of conductor feedthrough modules, and particularly to the structure and method of making a fiber optic feedthrough module.

Conductor feedthrough modules have particular application in apparatus to penetrate bulkheads used in nuclear power facilities where durability and performance requirements are very demanding.

For example, electrical penetrant structures are known for feeding sealingly several electrical conductors in a single module through a bulkhead wall. Such structures are shown in U.S. Pat. Nos. 3,601,526 and 3,680,208, assigned to the assignee of the present application.

The use of electrical conductors has disadvantages in certain applications because of magnetic effects created by passage of electric current through the conductor or the induction of an electric current therein due to an ambient varying magnetic flux environment.

Such disadvantages are avoided by use of a fiber optic element to conduct an optical signal instead of a metal conductor to transmit an electrical signal. However, the fragility of a fiber optic element presents special problems when attempting to incorporate it in a module.

Accordingly, the primary object of the present invention is to provide a fiber optic feedthrough module which is capable of utilization in an extremely hostile environment to withstand pressures higher than 30,000 psi, or a temperature range of from −40° F. to higher than 325° F., or a radiation level as high as 225 megarads, or to provide a positive moisture proof barrier under pressurized environments, or to withstand high vibration levels, or is unaffected by high shock and acceleration levels, or possesses a long life under extremely humid conditions, or is unaffected by salt water environments.

The inventive fiber optic feedthrough module, being capable of transmitting an optical signal, can be employed as a component in suitable control circuits, and operatively associated with instrumentation where penetration through a bulkhead is required. The module may be sized to fit a particular application as to length and transverse dimension, may be used with any standard fiber optic connector, and can be used with conventional mounting and sealing hardware.

Besides use in nuclear power facilities, the inventive fiber optic feedthrough module has practical applications in explosive environments, in high pressure and vacuum atmospheres, in underwater equipment, in military and aerospace equipments, in corrosive environments, where exposed to high radiation levels, and in fire seal barriers.

SUMMARY OF THE INVENTION

The present invention provides a fiber optic feedthrough module which comprises a metal sleeve, a fiber optic element extending through such sleeve in spaced relation thereto, and a tandem series of centrally-apertured mating annular sealant bodies of thermoplastic material surrounding such fiber optic element and compressed between it and such sleeve.

The present invention also contemplates a method of making such a module by a swaging operation which protects the fragile fiber optic element from being broken by shear or fractured by crushing.

The foregoing objects and other advantages will become apparent from the following detailed description of a preferred embodiment of the invention shown in the accompanying drawing in which:

FIG. 1 is a fragmentary longitudinal sectional view through a loose assembly of metal sleeve, sealant bodies and fiber optic element prior to swaging according to the present invention.

FIG. 2 is a view similar generally to FIG. 1 but depicts the condition of the assembly after being substantially swaged from end to end, thereby to illustrate the final construction of the fiber optic feedthrough module.

FIG. 3 is an enlarged fragmentary portion of the section shown in FIG. 1 taken near the right end thereof.

FIG. 4 is an enlarged fragmentary portion of the section shown in FIG. 2 taken near the right end thereof.

FIG. 5 is an enlarged perspective view of one of the intermediate sealant bodies shown in FIG. 1.

FIG. 6 is a longitudinal sectional view through one a wall the form of inventive means for mounting on a wall the form of inventive fiber optic feedthrough module shown in FIGS. 1-5.

DESCRIPTION OF THE PREFERRED EMBODIMENT

Referring to FIG. 2, the number 10 represents generally the inventive fiber optic feedthrough module, which is shown as comprising a metal sleeve 11, a fiber optic element 12 extending through the sleeve in spaced relation thereto, and a tandem series of centrally-apertured mating annular sealant bodies 13 surrounding element 12 and compressed between it and said sleeve. Preferably, a different end body 14 is at the right end of sleeve 12 and a still different end body 15 is at the left end of this sleeve, in the final form of the module as shown in FIG. 6.

Referring to FIG. 1, sleeve 11b (before swaging) is an elongated tubular metal housing, preferably stainless steel. It is cylindrical in cross section throughout its length, having a cylindrical bore 16 of uniform diameter or inside transverse dimension from end to end. The sleeve also has an external periphery 18 concentric to bore 16 and which is uniform from end to end, except for an external groove 19 near at least one end and preferably near each end. This groove 19 preferably has an axial length so as to overlap or span peripheral portions of two adjacent sealant bodies 13b (before swaging) arranged within sleeve 11b. This groove also has a depth about half the wall thickness of the sleeve, as best shown in FIG. 3.

The intermediate sealant bodies 13 are identical to one another. Referring to FIG. 5, each body 13b is shown as including an enlarged portion 20 having a cylindrical periphery 21 terminating in transverse end faces 22 and 23, an axial recess 24 in end face 22 provided by cylindrical side wall 25 and flat transverse bottom wall 26, and an axially extending reduced portion 28 projecting outwardly from end face 23 and provided with a cylindrical periphery 29 terminating in a flat transverse end wall 30. A central cylindrical hole 31 of small diameter extends completely through the reduced neck portion 28 and partially through the enlarged portion 20 of body 13b, terminating at opposite ends in surfaces 30 and 26. The enlarged portion 20, the reduced neck portion 28, and the recess 24 have their respective cylindrical surfaces 21, 26 and 23 coaxially disposed, as in hole 31, along the central longitudinal axis 27 of the body.

Referring to FIG. 1, right end body 14b (before swaging) is similar to any intermediate body 13b except that it has no reduced neck portion so that its outer end face 23e extends completely across body 14b. Left end body 15b (before swaging) is also similar to any intermediate body 13b except that it has no recess in its outer end, the face 22e of which extends completely across body 15b.

The sealant bodies 13b, 14b and 15b are made of a suitable thermoplastic material, such as polyethersulfone marketed by Imperial Chemical Industries Limited under the trademark "Polyethersulphone", or a polyamide-imide marketed by Amoco Company under the trademark "Torlon", or a polysulfone marketed by Union Carbide Corp. under the trademark "Udel".

The fiber optic element 12 is a commercially available item having an inner single or multiple core of glass, quartz or plastic covered with one or more layers of suitable compressible cladding and jacket material, such as polyether-ether-ketone, or ethylene-tetra-fluoroethylene copolymer, or polyamide, or polyvinyl chloride. Such an element is selected as to length depending on the length of metal sleeve 11 desired and the desired length of exposure of the element at each end of the sleeve.

In making the fiber optic feedthrough module embodying the present invention, a plurality of intermediate sealant bodies 13b and the end bodies 14b and 15b are threaded onto a fiber optic element 12 passing this element through the registered central holes 31 in their bodies, to provide a subassembly. The projecting neck portions 28 are inserted into the recesses 24 so that the opposing surfaces 26 and 30 on adjacent bodies abut, as depicted in FIG. 3 for an adjacent pair of intermediate bodies 13b.

Referring to FIG. 3, the axial depth of the recess 24 is slightly greater than the axial length of the neck portion 28 of the adjacent body received in such recess, so as to provide a clearance C1 between opposing recess bottom surface 26 and neck end surface 30.

The holes 31 have an inside diameter slightly larger than the outside diameter of the fiber optic element 12 thereby to provide a clearance C2.

The recesses 24 have an inside diameter slightly larger than the outside diameter of the neck portions 28 so as to provide a clearance C3 between corresponding opposing surfaces 25 and 29.

The metal sleeve 11b has an inside diameter slightly larger than the outside diameter of the enlarged portions 20 so as to provide a clearance C4 between the peripheral body surfaces 21 opposing sleeve bore surface 16.

Typically, the various clearances C1, C2, C3 and C4 are several thousandths of an inch, for example, ranging between 0.003" to 0.005". These clearances allow the various bodies 13b–15b to be readily slid over the fiber optic element 12, the pairs of adjacent bodies 13b–15b to be mated, and the subassembly so provided to be inserted into metal sleeve 11. The string of bodies 13b–15b on an element 12 are arranged in the sleeve 11b so that a portion of right end body 14b and a portion of the left end body 15b severally partly extend out of the corresponding end of the sleeve, as depicted in FIG. 1.

The loose assembly so provided is then swaged in a conventional swaging machine having swaging dies typically illustrated at 32 and 33 in FIG. 2. As is well known, the item to be swaged, here specifically the loose assembly of metal sleeve 11b, tandem series of mated sealant bodies 13b, 14b and 15b of compressible thermoplastic material, and fiber optic element 12, is fed axially through the opening formed by the swaging dies 32 and 33. Suitable drive means (not shown) cause these dies to move toward each other and in the process the loose assembly is radially compressed to a smaller diameter than it had as depicted in FIG. 1. Referring to FIG. 2, the slightly more than right half of the assembly depicted therein has been swaged, whereas the left hand portion of the assembly shown surrounded by the swaging dies 32 and 33 has not as yet been swaged. The module 10 fully swaged from end to end is depicted in FIG. 6.

Referring to FIGS. 2 and 4, it will be seen that as a result of the swaging operation the wall section of metal sleeve 11 formed with annular groove 19 is offset outwardly, as indicated at 19a, with respect to the adjacent wall portions of this sleeve. As shown in FIG. 4, this offset wall portion 19a has an external surface 34 which is coterminous with the adjacent external periphery 18a of the sleeve at opposite ends of wall section 19a. The external surface, in other words, has substantially the same diameter over the portions of the sleeve which had been provided with grooves 19 as compared with the portions of the sleeve unprovided with such grooves. After swaging, the exterior of sleeve 11 where groove 19 had been is detectable only by the annular slanted V-shaped grooves typically illustrated at 35, one at each end of where the end wall of groove 19 had been.

Offset wall section 19a has an internal surface 36 which is offset radially outwardly with respect to the final internal wall surface 16a of sleeve 11. In other words, the diameter of transverse inside dimension of internal annular wall surface 36 is greater than that of annular internal wall surface 16a. The transition from the diameter of wall surface 16a to that of wall surface 36 is gradual as indicated at 38 at each end of wall section 19a. The portion of the interior of sleeve 11 after swaging defined by transitional end portions 38 and intermediate enlarged wall surface 36 provides a contoured chamber or enlarged chamber into which as a result of the swaging operation a portion of the compressed bodies of at least two adjacent and mated bodies 13 extends to fill and seal this chamber. This provides a mechanical interlock between the sleeve and compressed thermoplastic material, which prevents blowout of the tandem series of mated sealant bodies, when either outer end 22e or 23e is subjected to a high pressure or high vacuum.

It is pointed out that as a result of the swaging operation all of the clearances C1–C4 that had existed between the various components have been eliminated. In fact, the original sealant bodies 13b and the inner parts of end bodies 14b and 15b have been compressed radially between the end limits of sleeve 11 into a voidless unitized new sealant body designated 13a (after swaging) which is in a state of compression and firmly and sealingly engages the internal surface of the sleeve and the fiber optic element which this unitized body surrounds, as well as the contacting surfaces of adjacent original individual sealant bodies. More specifically, the central fiber optic element 12 has been grasped by unitized body 13a. As previously noted, the transverse filling of the enlarged internal chamber formed by surfaces 36 and 38 serves to interlock unitized sealant body 13a to metal sleeve 11. Not only does there exist this mechanical interlocking, but as well the unitized sealant body 13a is firmly compacted against the internal surfaces 16a, 38 and 36 of metal housing 11 and also against the external surface of fiber optic element 12.

The amount of reduction in gross diameter of the module 10 after swaging as compared to before swaging, coupled with the initial radial clearances C2, C3 and C4, is such as to provide a significant reduction in the collective cross sectional area of the unitized sealant body 13a and the layers on the core of the fiber optic element 12.

Specifically, the initial collective cross sectional area of these compressible layers and joined sealant bodies 13b before swaging is reduced from 10 to 35% after swaging, depending upon the thickness of cladding and jacket included in the fiber optic element 12.

The seal produced between unitized sealant body 13a and fiber optic element 12 and metal sleeve 11 prevents leaks axially through the module, either along the interface between this sealant body and the surrounding metal sleeve or along the interface between this sealant body and the fiber optic element. This specific reduction in cross sectional area produces an effective seal capable of withstanding the standard total gas leak rate specified for a containment structure in a nuclear power generating station, of not greater than $1 \times 10^{-6}$ cubic centimeters per second of dry helium at $20° C. \pm 15° C$. at a pressure of 100 psig.

A feature of the invention is that the core of the fragile fiber optic element 12 is not sheared or fractured during swaging. This results from providing a multiplicity of relatively short intermediate sealant bodies 13b and end sealant bodies 14b and 15b of thermoplastic material which can be individually drilled before-hand to provide a truly central axis through hole 31, and also from interfitting coaxial parts of adjacent bodies together so as to align the central holes accurately. Thus no wandering non-axially directed central holes exist which could subject the fiber optic element to shear forces when the loose assembly is subjected to radial forces during swaging. It is practically impossible to drill a long hole of small diameter through an elongated body of thermoplastic material so as to provide a through hole which does not wander laterally from the central longitudinal axis of the body.

Referring to FIG. 6, a suggested type of mounting is disclosed for the swaged fiber optic feedthrough module 10 described above as to structure and method of manufacture, which in that figure is represented generally by the number 40. As indicated hereinabove, the purpose of the module is to feed the fiber optic light conductor in a sealed manner through a wall or bulkhead. In FIG. 6, such wall is indicated at 41. It is shown as having an internally threaded hole 42 which receives the externally threaded nipple 43 of a gland body 44. This gland body is shown as having an internal through bore 45 through which module 10 extends. The outer end portion of this bore 45 is shown as enlarged to accommodate a ferrule 46, backed up by an externally threaded gland follower 48 screwed into the internally threaded outer end bore portion. The inner end of follower 48 bears against ferrule 46 to force its external tapered surface against the internal tapered transition surface 49 of bore 45. The exposed exterior portions of gland body 44 and gland follower 48 are out-of-round to allow the application of wrenches (not shown). Turning the follower relative to the body so as to screw the follower into the body enables pressure to be applied to the ferrule and compress the same so as to sealingly engage and firmly grip the external surface of module 10. The mounting means shown in FIG. 6 is conventional and merely suggestive. Any other suitable means or mode of mounting the module 10 may be employed.

If desired, a number of modules 10 in mutually spaced and parallel arrangement might be embedded in a single sealant body surrounded by a metal housing.

While the metal sleeve 11 of module 10 has been illustrated as housing a continuous series of mating sealant bodies to provide an uninterrupted continuous unitized sealant body 13a, it will be understood that this unitized body can be interrupted, as where an elongated sleeve is required to penetrate a relatively thick wall, so that a tandem series of mating sealant bodies 13 is provided adjacent each end of the sleeve before swaging and does not completely fill the sleeve from end to end after swaging.

Also, while the metal sleeve 11 of module 10, housing continuous unitized sealant body 13a, is shown as having a portion of its wall 19a adjacent each end provided with an enlarged transverse inside dimension contacting the unitized sealant body 13a to provide the mechanical interlock between the sleeve and compressed thermoplastic sealant material, this is only preferred, and a single interlock may be found sufficient for application of the module in some environments. However, there should be at least one interlock between each length of uninterrupted unitized sealant body in a given sleeve, which spans the peripheries of at least two adjacent individual sealant bodies in such unitized body.

Other variations and modifications in the illustrated module and method of making the same may occur to those skilled in the art without departing from the spirit of the invention, the scope of which is to be measured by the appended claims.

What is claimed is:

1. A fiber optic feedthrough module, comprising
   (a) a metal sleeve,
   (b) a fiber optic element extending through said sleeve in spaced relation thereto, and
   (c) a tandem series of centrally-apertured mating annular sealant bodies of thermoplastic material surrounding said element and compressed between said sleeve and element.

2. A fiber optic feedthrough module according to claim 1, wherein each of said bodies intermediate the end ones includes an enlarged portion having an axial recess in one end and an axially extending reduced portion at its opposite end, the reduced portion of one of said intermediate bodies projecting into said recess in the adjacent one of said intermediate bodies.

3. A fiber optic feedthrough module according to claim 2, wherein said enlarged and reduced portions and said recess of each of said intermediate bodies are cylindrical and coaxial.

4. A fiber optic feedthrough module according to claim 3, wherein said reduced portion of one of two such mating intermediate bodies fills said recess in the other.

5. A fiber optic feedthrough module according to claim 2, wherein each end bodies severally partly extend out of the corresponding end of said sleeve, one of said end bodies having a reduced inner portion projecting into said recess in the adjacent intermediate body, the other of said end bodies having a recess in its inner end receiving said reduced portion of the adjacent intermediate body.

6. A fiber optic feedthrough module according to claim 1, wherein a portion of the length of said sleeve adjacent at least one end thereof has an enlarged transverse inside dimension and contacts the peripheries of at least two adjacent sealant bodies so as to provide a mechanical interlock between said sleeve and compressed thermoplastic material.

7. A fiber optic feedthrough module according to claim 6, wherein said thermoplastic material is polyethersulfone.

8. A fiber optic feedthrough module according to claim 6, wherein said thermoplastic material is polyamide-imide.

9. A fiber optic feedthrough module according to claim 6, wherein said thermoplastic material is polysulfone.

10. A method of making a fiber optic feedthrough module, comprising the steps of
 (a) providing a plurality of identical centrally apertured annular sealant bodies of thermoplastic material severally including an enlarged portion having an axial recess in one end and an axially extending reduced portion at its opposite end,
 (b) threading said bodies in abutting relation onto a fiber optic element having at least one layer of compressible material on a core so that said reduced portion on one of two adjacent such bodies is received in said recess in the other thereby to provide a subassembly,
 (c) inserting said subassembly in a metal sleeve having adjacent at least one end an external annular groove to provide an assembly, and
 (d) swaging said assembly to compress said bodies and layer between said sleeve and core to reduce by from 10 to 35 percent the collective cross sectional area of said bodies and layer between said core and said sleeve unprovided with said groove.

* * * * *